United States Patent [19] [11] 3,930,473
McFarland, Jr. [45] Jan. 6, 1976

[54] MANIFOLD FOR INTERNAL COMBUSTION ENGINES HAVING STEPS IN THE WALLS OF THE MANIFOLD RUNNERS

[75] Inventor: James D. McFarland, Jr., Chatsworth, Calif.

[73] Assignee: Edelbrock Equipment Company, El Segundo, Calif.

[22] Filed: Apr. 15, 1974

[21] Appl. No.: 460,695

[52] U.S. Cl............................ 123/52 M; 123/52 MV
[51] Int. Cl.²........................................ F02B 75/18
[58] Field of Search........... 261/DIG. 55; 123/52 M, 123/52 MV, 52 MC, 141, DIG. 2

[56] References Cited
UNITED STATES PATENTS

| | | | |
|---|---|---|---|
| 1,305,174 | 5/1919 | Smith | 123/141 |
| 2,011,994 | 8/1935 | Ball | 123/52 M |
| 2,043,079 | 6/1936 | Timian | 123/52 M |
| 2,066,923 | 1/1937 | Wolfard | 123/52 M |
| 2,163,040 | 6/1939 | Jacoby | 123/52 M |
| 2,215,337 | 9/1940 | Silverstein | 123/52 M |
| 2,241,461 | 5/1941 | Jacoby | 123/52 M |
| 2,639,230 | 5/1953 | Lefebre | 123/141 X |
| 2,727,502 | 12/1955 | Grillet et al. | 123/52 M X |
| 3,393,984 | 7/1968 | Wisman | 123/52 M X |
| 3,559,963 | 2/1971 | Cedarholm | 261/DIG. 19 |
| 3,744,463 | 7/1973 | McFarland, Jr. | 123/52 M X |
| 3,785,628 | 1/1974 | Lang | 261/65 |

Primary Examiner—Charles J. Myhre
Assistant Examiner—William C. Anderson
Attorney, Agent, or Firm—Christie, Parker & Hale

[57] ABSTRACT

A plurality of steps in each runner of a manifold from the exit of the runners towards a plenum of the manifold are located where mixture velocity is relatively low with respect to mixture velocity elsewhere in the runner in the same velocity profile. The steps control reverse mixture flow and increase the amount of mixture entering the engine's cylinders.

27 Claims, 5 Drawing Figures

MANIFOLD FOR INTERNAL COMBUSTION ENGINES HAVING STEPS IN THE WALLS OF THE MANIFOLD RUNNERS

BACKGROUND OF THE INVENTION

The present invention relates in general to intake manifolds for internal combustion engines. More in particular, it relates to manifolds having means for preventing reverse flow of fuel and air mixture in the runners of the manifold and for increasing the amount of fuel and air mixture delivered to an engine.

A carbureted internal combustion engine employs an intake manifold to distribute a fuel and an air mixture produced by a carburetor to the cylinders of the engine.

An intake manifold typically has a plenum chamber below the carburetor to receive a mixture of fuel and air from the carburetor. From the plenum the mixture is directed to the cylinders through ducts called runners. The runners exit from the manifold at inlet ports to the engine. These ports lead to the cylinders through inlet valves. When each cylinder has an associated runner not shared with another cylinder, the manifold may be called an independent runner manifold.

A fuel and air mixture is drawn into each cylinder of an engine by a vacuum created there by downward piston movement during the intake stroke of the cylinder. Inlet and exhaust valves into each cylinder provide for the admission of the fuel-air mixture into the cylinder and the exhaustion of products of combustion from the cylinder. In modern internal combustion engines, both the inlet and exhaust valves are open at the same time during a portion of a cycle. Some of this overlap occurs while the cylinder's piston is ascending. At this time the inlet valve is just opening and the exhaust valve is finally closing. A reason for the overlap is to give a fuel-air charge in a runner of a manifold the opportunity to see a large inlet valve opening when the piston begins to descend in the cylinder and produce a vacuum. However, during the overlap the pressure within a cylinder is greater than that in the manifold and this differential is compounded by the ascending piston. Consequently, exhaust products pass through the inlet valves from the cylinders they serve and into the runners of the manifold. These exhaust products tend to produce reverse fuel and air mixture flow towards the carburetor by "pushing" the mixture.

An engine acts as a pump when it produces the vacuum that constitutes the driving force acting on a fuel-air charge to force the charge into the cylinders. This pumping requires power and the more power required to get a given mass of charge into the cylinders the lower the engine's efficiency. Power loss attends reverse mixture flow. To the extent that the flow of exhaust gases into a manifold requires the admission from the manifold of these exhaust gases back into the cylinder, work is required and efficiency is lost. The engine simply has to pump more to get both the fuel-air mixture and exhaust charge into its cylinders.

U.S. Pat. No. 3,744,463 to James McFarland, Jr. describes an improved independent runner intake manifold which has a step or sudden enlargement proximate the exit of each runner into an associated inlet port of an engine. The step is located where mixture stream velocity is relatively low in comparison with mixture stream velocity elsewhere in the same velocity profile. Mixture stream velocity profile simply means the curve across a cross section of a runner defined by the total of the velocity magnitude vectors at the large cross section. The patent observes that this sudden enlargement acts as a dam or block in preventing reverse flow of exhause gases up a runner towards a carburetor. The patent states that the sudden enlargement or step can dissipate the energy of a pressure pulse traveling up a runner as well as directing it back towards the inlet port.

Today internal combustion engine design is very sensitive to the amount of exhaust gas emissions of the pollutants of unburned hydrocarbons, carbon monoxide and the oxides of nitrogen. In addition, modern engine design is becoming more sensitive to problems of fuel economy. In recent years, the problem of fuel economy has been aggravated because of emission control standards which have had a tendency to reduce economy.

SUMMARY OF THE INVENTION

The present invention provides an improved manifold for distributing the fuel-air mixture from a carburetor into the cylinders of an internal combustion engine which is characterized in having a plurality of steps in runners of the manifold proximate the exit of the runners into associated inlet ports of the engine and where mixture stream velocity is low relative to mixture stream velocity elsewhere in the same velocity profile. It has been observed that this plurality of steps improves an engine's emission performance and fuel economy.

It is thought that the steps provide barriers and energy dissipaters for reverse fuel-air flow from the exit of a runner towards a carburetor. In addition it is thought that the steps dissipate pressure pulse moving in the direction of the carburetor. It is also thought that the steps help to reintroduce fuel previously separated out of a mixture of fuel and air back into the fuel-air mixture stream.

The presently preferred particular embodiment of the present invention provides an improved manifold of the single plane type having independent runners for each of an engine's cylinders. The manifold has a single plenum adapted to mount a single carburetor. This plenum is located in about the middle of the manifold. The runners extend for registration with inlet ports from the plenum. As viewed from the plenum towards a runner, each runner has an inside and an outside wall. The inside wall is closer to the viewer than the outside wall. From the same perspective, each runner also has a roof and a floor. The cross section through the runner is approximately quadrilateral. Again as viewed towards a runner from the plenum, each runner curves slightly towards the lateral outside of the manifold and away from the longitudinal centerline of the manifold.

In the manifold just described and for a so-called small block Chevrolet V-8 engine, it has also been observed that flow of fuel and air proximate the outlet of each runner and close to the outside wall is more quiescent than flow in the same cross section but closer to the inside wall. In terms of velocity vectors, the flow of mixture close to the outside wall of each runner near its exit has a velocity which is relatively low with respect to mixture velocity elsewhere in the same velocity profile. It is thought that when there is reverse exhaust gas flow (reversion flow) it occurs at least in part in the region quiescent in the primary flow of fuel and air towards the engine. It is also thought that at least a significant amount of the energy of any pressure pulses from the cylinder traveling up a runner do so in the same region. The provision of steps along the outer wall, the region or zone of relative quiescence during primary flow, and in the path of significant reversion flow and pulses, acts as the barrier and energy dissipater for reversion flow and pressure pulses without substantially affecting the flow of fuel and air in the desired direction. The steps result in better emission performance and fuel economy. It is theorized that one of the reasons for this, in addition to the barrier qualities of the steps, is that the steps "energize" a boundary layer to bring into the primary stream fuel which had previously separated out of the stream.

It has been found that a plurality of steps is beneficial but that too many steps can adversely comprise primary flow towards the cylinder. The number of steps and their exact location depends on the particular manifold. The steps should be in areas of a runner experiencing relatively quiescent primary flow. It is preferred to have a face of each step facing an inlet port and reversion flow and at least at right angles to such reversion flow. A side of the step extending from the face to meet the wall of the runner proper preferably extends approximately parallel to the expected path of reversion flow. It is not desired to have this side face reversion flow or to have the face oriented such that reversion flow striking either the face or the side would tend to bounce into the area of primary flow. It is also thought that having the included angle between the face and the side of each step less than 90° would adversely affect primary stream flow by creating excessive eddying.

It is preferred because of mold core pulling not to have any undercut surfaces. This is another reason for having the side of the step approximately parallel with the direction of primary flow. To effect improved damping and blocking it may be necessary to orient the steps such that reversion flow is reflected from the face of the steps to an area away from the primary flow. In one embodiment of the present invention this is accomplished by fanning the steps of floor to roof with the fan opening in the direction of the roof. In this particular embodiment, primary flow activity in cross sections of the runners in the region of the steps is nearer the floor than the roof. Because of mold core pulling purposes, however, it may not be possible to fan the steps as much as would otherwise be desired.

These and other features, aspects and advantages of the present invention will become more apparent from the following description, appended claims and drawings.

DESCRIPTION OF THE PREFERRED EMBODIMENT

Figure 1:
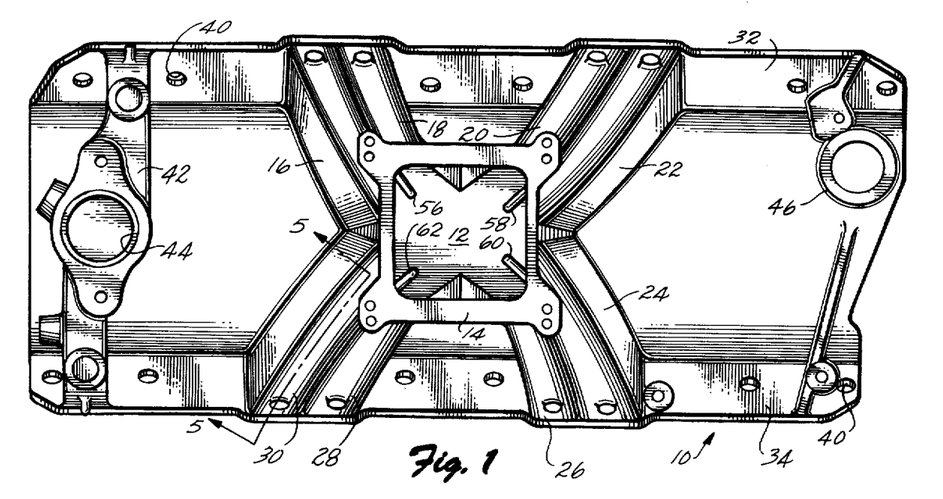
FIG. 1 is a top plan view of a preferred embodiment of the manifold of the present invention.
Figure 2:
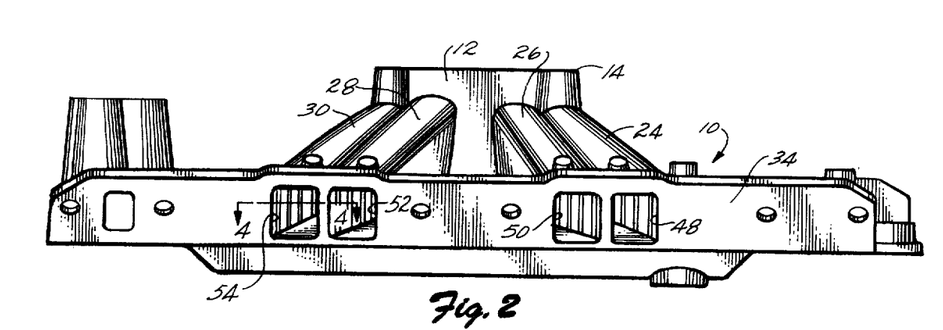
FIG. 2 is a side elevational view of the manifold of FIG. 1.
Figure 3:
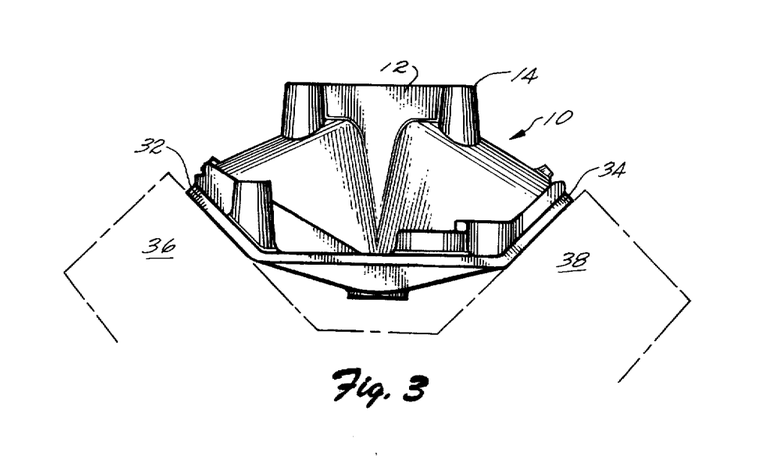
FIG. 3 is an end elevational view of the manifold of FIG. 1.

With reference to FIGS. 1 through 3, an intake manifold 10 for an internal combustion engine is illustrated. This manifold is of the single plane type. It is designed for use with a V-8 engine. A V-8 engine has eight cylinders and eight inlet ports. The manifold has a plenum 12 bounded at its top by a carburetor mounting base 14. The carburetor mounting base mounts a four-throat carburetor. Communication between the plenum and each inlet port of the engine is effected through an independent runner. That is, there are eight runners from the plenum to the inlet ports of an engine. These runners are indicated by even reference numerals 16 through 30. The runners are ducts through which a mixture of fuel and air travels from the carburetor into the cylinders of an engine. On its lateral sides, manifold 10 has a pair of angled mounting flanges 32 and 34 for securing the manifold between cylinder banks 36 and 38 (FIG. 3) of an engine. The included angle between the flanges corresponds with the included angle between cylinder banks. Means for mounting the manifold to the engine is typically by bolts through holes 40 in the flanges. The manifold has a water crossover duct 42 and an outlet 44 for communication with a radiator. It also has a distributor mounting base 46 for the engine's distributor. These are incidental features to the manifold and do not contribute to the invention.

The runners exit through mounting flanges 32 and 34 as is shown for runners 24 through 30 in FIG. 2 by even numbers at 48 through 54.

The runners are oriented in runner pairs. The runners of a given runner pair are divided by an intermediate wall. Thus runners 16 and 18 are divided by an intermediate wall 56. Intermediate walls 58, 60 and 62 divide runners 20 and 22, 24 and 26, and 28 and 30, respectively.

Manifold design is sensitive to several problems.

One of these problems is that the fluid transported through the manifold is a mixture of combustion air and fuel. The fuel exists in two states, one gaseous and the other atomized liquid particles. The latter constitutes a large percentage of the fuel charge. Because of the heterogeneity of the fuel and air charge passing through runners, there is a problem of separation of the fuel from the air of the charge.

If the velocity of the charges going through the runners is not sufficiently high, fuel will separate from its transporting air stream and deposit on the walls of the runners even in straight sections of the runners. Once on the wall it is difficult for the fuel particle to get back into the stream because there is not much energy in the boundary layer on the wall and there is a retaining force on the particles exerted by the wall. Another cause of separation is centrifugal force acting on fuel particles going around corners which tends to deposit the particles on the wall of the runner towards which the force is directed. Separated fuel no longer has the characteristic of fine fuel particle size but instead is characterized by relatively larger globules of fuel which ultimately find their way into a combustion chamber. Separation is not desirable by not it adversely affects combustion events by presenting in combustion chambers finely divided particles of fuel with a large surface-to-volume ratio. Additionally, separation can adversely affect the fuel-air ratio of a charge delivered to the engine's cylinders by making the fuel-air ratio different between cylinders. Accordingly, manifolds are designed to avoid fuel separation and the illustrated manifold does this.

By providing a relatively constricted runner cross section and a relatively straight path from the plenum to the combustion chamber, fuel separation problems are avoided to a large extent. The straight path tends to eliminate the problem of separation occasioned by centrifugal force. A relatively constricted cross-sectional area for mixture flow transports the charge rapidly and imparts to the fuel particles a relatively high kinetic energy which tends to keep the particles suspended in the carrying air stream.

Another problem with manifold design is occasioned by reversion. Reversion is a phenomenon which occurs because of inlet and exhaust valve overlap in an internal combustion engine. At the beginning of an inlet stroke the inlet and exhaust valves of an internal combustion engine are typically both open. The inlet valve is just opening and the exhaust valve is just closing. At the same time the piston is ascending in the cylinder. Also at this time the pressure within the cylinder is considerably greater than that existing in the intake manifold because of the presence of exhaust products and the ascending piston. When the piston begins to descend in the cylinder it creates the vacuum which constitutes the driving force between atmosphere and the cylinder for transporting the fuel-air mixture from a carburetor into the cylinder. With an adverse pressure condition existing at the time that the inlet valve opens, products of combustion will tend to flow from the cylinder and into the runners towards the plenum. When the inlet valves open, there can also be an adverse pressure pulse which travels up to the runners. There are several disadvantages arising from this reversion phenomenon. To the extent that combustion gases occupy manifold volume they must again be pushed through the manifold and into the combustion chambers ahead of a fuel-air charge. This requires work and reduces the efficiency of the engine. In addition, reversion can lower the amount of fuel-air charge in the combustion chambers and consequently reduce an engine's efficiency and performance. The reduction in the mass of charge is by occupation of combustion chamber space by combustion gases. In aggravated cases, reversion can force a fuel-air mixture backup through a carburetor to create a condition called stand-off. This condition is evidenced by a cloud of vapor above the carburetor. Reversion can also adversely affect the fuel-air ration. As exhaust gases push mixture gases back up through the carburetor and past the carburetor's venturis, it draws gasoline into the reverse flowing stream. When flow is again reversed so that gases are flowing from the plenum into the cylinders, the already carbureted mixture is drawn again through the venturis to draw more fuel. Pressure pulses can also hurt engine efficiency by producing inter-runner interference and flow resistance. An example of inter-runner interference is when a pressure pulse causes a rarification in one runner which draws fuel and air from another runner just when the mixture in the latter should be going towards the cylinder served by it.

It is known that to the extent an engine can be made more efficient, the engine will be more economical to run. That is, its gas mileage increases. Accordingly, if a manifold is efficient, the pumping losses of an engine are reduced and the engine is more economical. Economy also can reduce emissions.

There is a considerable stress in modern engine design to reduce as much as possible the pernicious emissions from an engine. To date the worst of these pernicious emissions are considered to be the oxides of nitrogen, unburned hydrocarbons and carbon monoxide. The problem of emission generation is indeed extremely complex. In an effort to reduce emissions, economy sometimes suffers. Oftentimes the reduction of the emissions of one pollutant results in the increase of another. At one time engines were carbureted relatively lean from maximum power and economy to reduce the emissions of unburned hydrocarbons. This produced a condition where these particular emissions were reduced but the emissions of the oxides of nitrogen increased.

An efficiently distributed fuel-air charge having a minimum amount of large globules of raw fuel generally decreases emissions. Emissions are also decreased when inter-cylinder fuel-to-air ratios are constant and optimized. Everything else being the same, the more efficient an engine, the lower the bad emissions.

The present invention provides in a manifold means for improving its flow characteristics which has resulted in improved economy and emission performance in a four-cycle, reciprocating internal combustuion engine.

U.S. Pat. No. 3,744,462 recognizes that the velocity of a mixture in a runner of a manifold is not usually uniform throughout the cross-sectional area of the runner. The velocity profile in any given cross section for primary flow might show areas of high velocity or activity and areas of relatively low velocity or activity. In areas of low velocity exhaust reversion flow is significant if not preferential. It has been found that by providing a plurality of steps or blocks in runner zones where primary stream activity is low, relative to activity elsewhere in the same cross-sectional area, that manifold performance is improved. It is thought that these blocks or steps prevent reversion exhaust gases from taking full effect by preventing longer distance traveling up a runner and thereby occupying less volume in the runner. It is also thought that the blocks or steps dissipate energy of the reverse flowing gases and pressure pulses. It is also thought that the steps might create a condition of turbulence whereby particled fuel leaving the primary stream can reenter the stream in vortexes created by the steps.

Figure 4:
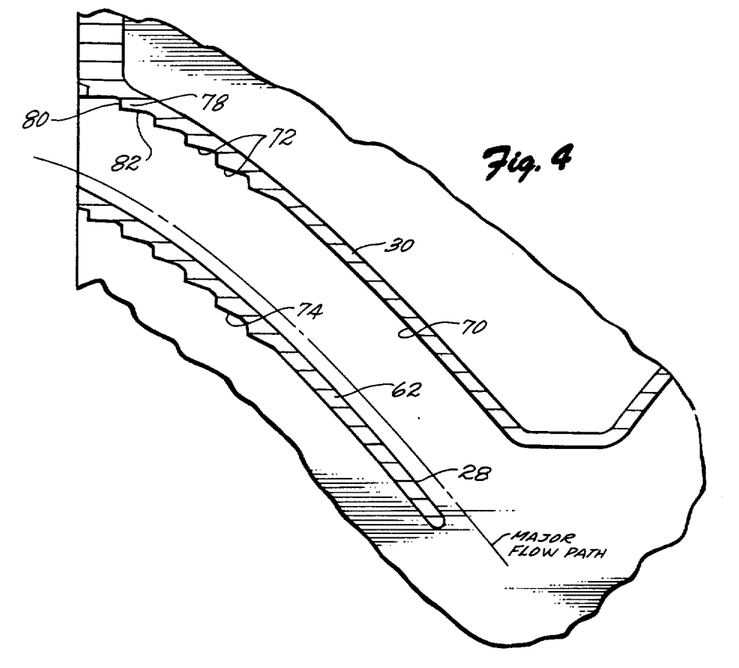
FIG. 4 is a fragmentary view in section taken at a slight angle to the horizontal plane of the manifold along lines 4—4 of FIG. 2 showing a pair of adjoining runners and step placement.
Figure 5:
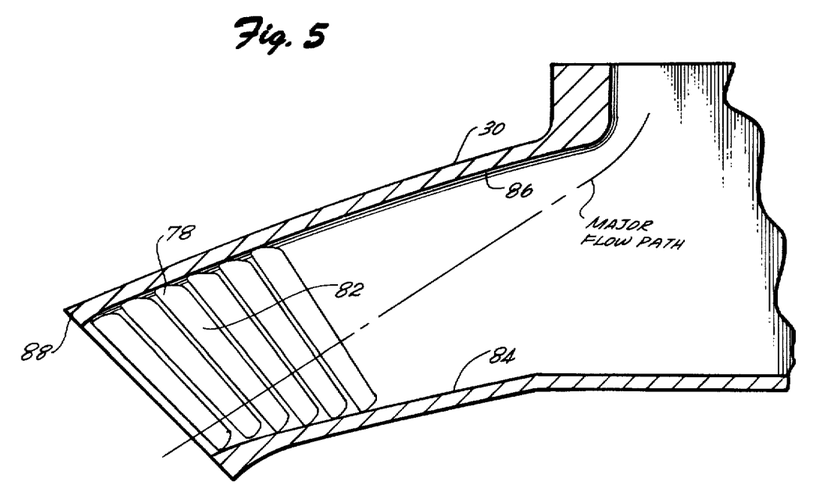
FIG. 5 is a fragmentary, sectional view of a runner taken generally in a plane at a slight angle to a vertical of the manifold taken along lines 5—5 of FIG. 1 illustrating the steps.

With reference to FIGS. 2, 4 and 5, the steps are shown for the illustrated manifold. Again these steps are located in an area where the primary stream velocity profile shows low flow activity. In other words, the steps are provided where mixture velocity is relatively low with respect to mixture velocity elsewhere in the same velocity profile. The zones in plan and elevation of high stream activity are indicated by the dashed lines and the legend "Major Flow Path" in FIGS. 4 and 5. Illustrative of what the figures show, proximate the outlet of the runner, the area of dominant primary flow activity is toward the floor and inside wall of the runner. Quiescent zones are along the outer wall and roof. Thus, a velocity profile reflecting the illustrated embodiment would be in three dimensions. In plan, the profile would be weighted toward the inner wall with the slope of the velocity curve from the inner wall to maximum velocity being much greater than the slope of the curve from the outer wall to the maximum velocity (disregarding signs indicating reversal of slope). Similarly, the velocity profile in elevation would be weighted toward the floor and the curve slope would be greatest from the floor to the maximum velocity. Again the quiescent zones close to the runner's outlet would be close to the outer wall and roof because in these zones velocity is relatively low over relatively wide bands. The number of steps illustrated is six for each runner and they are serially placed on the outside wall of each runner. By outside wall, it is meant that wall, viewed along the longitudinal axis of the manifold, which is furthest from the center of the plenum. Accordingly, and from the same perspective, the inside wall would be closer to the center of the plenum. Thus for runner 30 shown in FIGS. 4 and 5, an outer wall 70 has steps 72 in it. For runner 28, steps 74 are in intermediate wall 62, which is the outer wall for this runner. The steps extend from the exits of the runners up the runners a predetermined distance and then terminate. It has been found that if the steps extend too far up a runner towards the plenum that primary stream flow is adversely affected. In short, the predetermined distance is that distance where the step benefits to primary flow stream activity prevail over detriments to primary flow activity.

Each step preferably has a leading face which is more or less perpendicular to the direction of stream flow. Thus a typical step 78 of the series of steps 72 has a perpendicular face 80. Reverse flowing gases striking this face will dissipate a portion of their energy and to some extent will have a tendency to reverse themselves and flow in the primary flow direction. The same applies to pressure pulses striking the face. The number of steps increases the area of the steps available to arrest, dissipate, and reflect reverse flowing gases and pressure pulses.

To the extent that the face of a step is angled so that reverse flowing gases striking them reflect away from the wall on which the steps are placed and towards the zone of primary stream activity (reflecting towards the center of the runner), there is an adverse effect. This is because the reverse flowing gases will then tend to occupy areas where dominant stream activity naturally occurs. While it would appear that changing the angularity of the face so that it defines a pocket for trapping reverse flowing gases would be beneficial to reduce reversion effects, in at least one practical embodiment of the present invention it is thought that such a pocket would create undue turbulence in the primary stream direction which would adversely affect primary stream flow.

Each step also has a trailing side wall. Thus step 78 has a trailing side wall 82 extending from the free end of each step face. This side wall is oriented more or less parallel to primary stream flow direction occurring in the zone where the trailing side is located. The reason for this is the practical one of pulling mold cores. If there were a negative angle the pulling of mold cores would be complicated. In addition, if the trailing edge of the step were angled such that the angle it defines with the leading face were less than 90°, with the face in its original perpendicular orientation, a condition would be created where primary stream activity would be partially blocked.

As seen in both FIGS. 4 and 5, the steps are uniformly spaced. However, in FIG. 5 there is a slight fanning or divergence of the steps from a runner floor 84 to a runner ceiling 86. This fanning is thought to direct reversion towards the ceiling which happens to be in this particular manifold a zone or region of low stream activity. In addition, the fanning creates a larger leading facial area for the dissipation of reversion flow energy.

The particular manifold illustrated here is for a 351 cubic inch Chevrolet V-8 engine. The manifold has a step-to-step spacing measured from the same points in the steps, say from the edge between the step leading faces and trailing sides at the roof of 0.375 inches and at the floor 0.3125 inches. A preferred construction for optimum performance has the corresponding spacing at the roof 0.75 inches and at the floor 0.3125 inches. The former spacing is preferred because it facilitates mold core pulling. The width of the leading face is approximately 0.080 inches. If the face extends too far into the runner, it restricts primary flow and can separate fuel from primary flow.

At the exit of the runner the first step is not placed at the interface between the runner and the head of an engine equipped with the manifold but instead is moved up the runner slightly, say about 0.070 to about 0.080 inches. This spacing of the first step from the interface wall, illustrated at 88, provides material for machining and molding tolerances and avoids incomplete steps which would result if these tolerances were particularly deep.

Because the manifold is designed to optimize performance in the so-called mid-range engine speeds, which correspond to usual street driving conditions, the cross-sectional area of the runners is made smaller than would be the case if the manifold were designed for optimum high engine speed applications.

The following is a Table illustrating several results using manifolds constructed in accordance with the present invention, similar manifolds without steps, and original equipment manifolds. The results are Environmental Protection Agency mass test results for the California — Federal Test Cycle applicable for 1973 vehicles. The originally supplied manifold was a two-plane, over and under manifold, and the engine was a 1973 Chevrolet Impala with a displacement of 350 cubic inches. The carburetor used was a "Rochester Quadrijet". The other manifolds were single plane. An antipollution exhaust gas recirculation valve was used for all tests. The tests are grouped as A and B because the A tests were conducted with a vehicle having a relatively greater mileage on it than the one conducted for B. Test C is on the same vehicle as Test B but with a manifold differing from the manifold designated TM-1 in that the cross-sectional area of the runners was smaller.

TABLE I

|   |        | mi/gal | HC(gm/mi) | CO(gm/mi) | NO(gm/mi) | $CO_2$(gm/mi) | ExVol |
|---|--------|--------|-----------|-----------|-----------|---------------|-------|
|   | O.E.M. | 10.84  | 1.31      | 35.00     | 2.39      | 763           | 947.5 |
| A | TM-1   | 11.04  | 1.05      | 31.03     | 2.30      | 756           | 906.8 |
|   | TM-1S  | 11.44  | 0.71      | 21.68     | 2.19      | 743           | 890.1 |
|   | O.E.M. | 13.7   | 1.078     | 15.69     | 2.251     | 622.4         | 792.7 |
| B | TM-1   | 13.32  | 1.213     | 11.97     | 1.792     | 646.2         | 830.8 |
|   | TM-1S  | 13.84  | 2.038     | 11.73     | 1.615     | 619.1         | 819.4 |

TABLE I-continued

|   | | mi/gal | HC(gm/mi) | CO(gm/mi) | NO(gm/mi) | $CO_2$(gm/mi) | ExVol |
|---|---|---|---|---|---|---|---|
| C | TORK | 13.47 | 1.079 | 13.47 | 1.947 | 637.2 | 825.7 |
|   | TORK-S | 14.57 | 1.051 | 19.09 | 1.558 | 578.7 | 741.5 |

In the table:

| | |
|---|---|
| mi/gal | means miles per gallon |
| HC | means unburned hydrocarbons |
| gm/mi | means grams per mile |
| CO | means carbon monoxide |
| NO | means oxides of nitrogen |
| $CO_2$ | means carbon dioxide |
| ExVol | means exhaust gas volume at standard temperature and pressure |

O.E.M. means the original equipment manifold. TM-1 designates a manifold quite similar in construction to the one of the present invention except that it does not have steps.

TM-1S designates a manifold constructed in accordance with the present invention.

A second manifold quite similar to the TM-1 manifold but with a more constricted runner cross-sectional area is indicated in Test B as "TORK".

A manifold designated "TORK-S" is essentially the same as the "TORK" manifold except that it has steps constructed in accordance with the present invention.

It should be noted that the fuel economy between corresponding types of manifolds is improved with the steps. In all cases, the manifolds with the steps got better fuel economy than the O.E.M. manifolds. Hydrocarbon emissions improved with Tests A and C but show a detrimental increase with Test B. Tests A and B show a similar improvement in carbon monoxide. Test C shows increase in carbon monoxide. Note, however, that in all three tests the oxides of nitrogen improve and that the carbon dioxide emissions were also lower in the manifolds having the steps. Significantly, there is relatively low exhaust gas volume for manifolds with the steps with the exception of Test B.

The second table produced below was taken through the California — Federal Test Cycle applicable for 1973 vehicles. The carburetor in each instance was the Rochester Quadrijet. The tests and conditions were the same as in the previous table. The last column compares the TM-1 and TM-1S manifolds.

TABLE II

| | AIR/FUEL (A/F) RATIO COMPARISON | | | DIFFERENCE A/F RATIO WITHOUT AND WITH STEPS |
|---|---|---|---|---|
| | O.E.M MANIFOLD A/F RATIO | TM-1 MANIFOLD A/F RATIO | TM-1S MANIFOLD A/F RATIO | —=Lean, +=Rich |
| A | 17.2 | 15.7 | 16.1 | −2.5 |
| C | 16.4 | 16.0 | 16.8 | −5.0 |
| D | 16.0 | 16.3 | 17.8 | −9.2 |
| I | 15.9 | 16.1 | 16.9 | −4.9 |
| A | 15.4 | 15.0 | 14.9 | +0.6 |
| C | 16.8 | 16.8 | 16.8 | — |
| D | 17.8 | 18.7 | 18.7 | — |
| I | 16.1 | 16.6 | 17.3 | −4.2 |
| A | 17.1 | 15.6 | 16.2 | −2.5 |
| C | 16.6 | 16.6 | 17.1 | −3.0 |
| D | 17.1 | 17.4 | 18.0 | −3.4 |
| I | 15.7 | 16.4 | 17.2 | −4.9 |
| A | 17.2 | 15.1 | 15.4 | −1.9 |
| D | 16.0 | 15.9 | 17.2 | −9.9 |
| I | 15.9 | 16.3 | 17.1 | −9.7 |
| A | 16.8 | 15.0 | 15.4 | −2.7 |
| C | 17.1 | 17.3 | 17.3 | — |
| D | 17.1 | 17.6 | 18.3 | −4.0 |

In the table:

| | |
|---|---|
| I | means Idle |
| A | means Acceleration |
| C | means Cruise |
| D | means Deceleration |

The tests show that for the deceleration and idle modes, the air-to-fuel ratio is generally leaner than for the other modes with the manifold having the steps. It is thought that this confirms one of the theories behind the present invention. During deceleration and idle, manifold vacuum is relatively high. Reversion pulses under these conditions meet less resistance from fuel and air in the manifold. If there is a reduction in reversion pulses, there will be a reduction in mixture backflow through the carburetor. It will be recalled that this backflow produces an enrichened charge because the charge passes through the carburetor twice. With a reduction in reversion flow one would expect an increase in leaness and this is what the table shows.

In summary, the steps reduce the effect of reversion flow and thereby increase engine efficiency and reduce undesirable emissions. The improvements result from less fuel and air burned for a given power output, greater retention of fuel in the fuel and air stream, and more even inter-cylinder fuel and air distribution. The reduction in reversion was noted by the relative absence of carbon traces in manifolds with the steps over similar manifolds without the steps. The disruptive and too often efficiency reducing, economy losing, and pollution increasing upstream traveling pressure pulses are also dampened by the steps.

What is claimed is:

1. An improved manifold for a reciprocating internal combustion engine of the type having runners for communicating a fuel-air mixture from a source thereof to the engine, the runners having curved walls proximate the exit thereof to the engine, the improvement comprising:
 a plurality of serially spaced steps in each of the runners on a curved wall thereof from the exit of the runner to a predetermined point between the exit and the entrance to the runner, the steps being in a zone where mixture stream velocity is relatively low with respect to mixture stream velocity elsewhere in the same velocity profile and where the steps are in line-of-sight communication with the exit.

2. The improved manifold claimed in claim 1 wherein;
 each step has a face substantially perpendicular to the flow of mixture in the cross section of the runner proximate the face, each step face facing the exit of the runner in which the step is disposed.

3. The improved manifold claimed in claim 2 wherein:
 each step has a trailing side which joins the face at the latter's terminus toward the center of the runner in which the step is disposed.

4. The improvement claimed in claim 3 wherein the step-to-step spacing in each runner is substantially equal.

5. The improvement claimed in claim 1 wherein each step has a face substantially perpendicular to the path of expected reversion flow from an engine having the manifold.

6. The improvement claimed in claim 5 wherein each step has a trailing side extending from the free end of the step to the wall of the runner substantially parallel with the expected path of reversion flow.

7. The improvement claimed in claim 1 wherein:
 the steps diverge towards a zone where mixture stream velocity is relatively low with respect to mixture stream velocity in the same velocity profile and where the steps converge.

8. The improvement claimed in claim 7 wherein:
 each step is defined by a face and a trailing side, the face being substantially perpendicular to the path of expected reversion flow from an engine using the manifold, and the trailing side extending from the free end of the step to the wall of the runner in which the step is disposed substantially parallel with the path of expected reversion flow.

9. The improvement claimed in claim 8 wherein: in each runner, the step-to-step distance is substantially equal.

10. The improvement claimed in claim 9 in combination with a four-cycle, reciprocating internal combustion engine.

11. The improvement claimed in claim 1 in combination with a four-cycle, reciprocating internal combustion engine.

12. The improvement claimed in claim 11 wherein each step has a face substantially perpendicular to the path of expected reversion flow from the engine.

13. The improvement claimed in claim 12 wherein each step has a trailing side extending from the free end of the step to the wall of the runner in which the step is disposed substantially parallel to the expected path of reversion flow from the engine.

14. An improved manifold for a four-cycle, multiple cylinder, reciprocating internal combustion engine, the manifold being of the single plane type and which has a plurality of runners for communicating a fuel-air mixture from a source thereof to the cylinders of the engine corresponding in number to the number of cylinders in the engine, the improvement comprising:
 a plurality of steps in each runner on a curved wall thereof extending from the exit of the runner towards the source a predetermined distance, the steps being only in zones of the runner where mixture stream velocity is relatively low with respect to stream velocity elsewhere in the same velocity profile, and the steps being in line-of-sight communication with the exit.

15. The improvement claimed in claim 14 wherein:
 a. each step has a face approximately perpendicular to the direction of fuel-air mixture flow and extending a predetermined distance from the wall; and
 b. each step has a trailing side approximately parallel with the direction of fuel-air mixture flow and extending from an intersection with the face of the step to the runner wall.

16. The improvement claimed in claim 14 wherein:
 a. each step has a face approximately perpendicular to the direction of expected reversion flow extending a predetermined distance from the wall; and
 b. each step has a trailing side approximately parallel to the direction of exptected reversion flow and extending from an intersection with the face of the step to the runner wall.

17. The improvement claimed in claim 16 wherein the step-to-step distance is substantially constant.

18. The improvement claimed in claim 14 wherein:
 each step has a face approximately perpendicular to the runner wall on which the step is disposed and the steps diverge with respect to adjacent steps towards a zone where the mixture stream velocity in the same velocity profiles are relatively low with respect to the mixture stream velocity towards the converging ends of the steps.

19. The improvement claimed in claim 18 wherein:
 each step has a trailing side approximately parallel with the direction of expected reversion flow and extending from an intersection with the face of the step to the runner wall.

20. The improvement claimed in claim 14 in combination with the engine.

21. An improvement in a single plane, independent runner intake manifold for idstributing a fuel and air mixture from a source thereof to the cylinders of a V-8 four-cycle, reciprocating, internal combustio engine having its cylinders arrayed in two parallel banks of four cylinders each, the manifold having a lingitudinal axis midway between the banks of cylinders, a central plenum for receiving the mixture, and an independent runner for each of the cylinders extending longitudinally and laterally to the inlet port of its associated cylinder from the plenum, each runner curving towards the lateral direction it takes and having a generally quadrilateral cross section for mixture flow, and each runner having an outside and an inside wall as viewed longitudinally from the plenum, the improvement comprising:

a plurality of serially spaced steps in each of the runners beginning near the exit thereof into the inlet port and extending towards the plenum a predetermined distance, the steps being only in zones where mixture stream velocity is relatively low with respect to mixture stream velocity elsewhere in the same velocity profile, on a curved wall of the runner, and in lines-of-sight from the exit.

22. The improvement claimed in claim 21 wherein the steps for each runner are on the outside wall thereof.

23. The improvement claimed in claim 22 wherein each step has a face extending from the wall to a free end which is substantially perpendicular to the direction of mixture flow through the runner and which faces the inlet port for the runner.

24. The improvement claimed in claim 23 wherein each step has a side extending from the free end of the face substantially parallel to mixture flow to the outside wall.

25. The improvement claimed in claim 24 wherein the steps of each runner diverge from the floor thereof to the roof.

26. The improvement claimed in claim 25 wherein the step-to-step distance in each runner is substantially equal.

27. The improvement claimed in claim 26 in conbination with the engine.

* * * * *

UNITED STATES PATENT AND TRADEMARK OFFICE
CERTIFICATE OF CORRECTION

PATENT NO. : 3,930,473
DATED : January 6, 1976
INVENTOR(S) : James D. McFarland, Jr.

It is certified that error appears in the above-identified patent and that said Letters Patent are hereby corrected as shown below:

Column 1, line 40, "a" should be --the--.

Column 2, line 2, delete "large" at end of line;

Column 2, line 5, "exhause" should be --exhaust--.

Column 3, line 16, "comprise" should be --compromise--;

Column 3, line 42, "of" should be --from--.

Column 4, line 63, "by not" should be --because--;

Column 4, line 64, after "by" insert --not--.

Column 5, line 34, after "up" delete "to".

Column 6, line 25, "combustuion" should be --combustion--;

Column 6, line 27, "3,744,462" should be --3,744,463--.

Column 12, line 35, "exptected" should be --expected--.

Claim 21, column 12, line 56, "idstributing" should be --distributing--;

Claim 21, column 12, line 58, "combustio" should be --combustion--;

Claim 21, column 12, line 60, "lingitudinal" should be --longitudinal--.

Claim 27, column 14, line 14, "conbination" should be --combination--.

Signed and Sealed this twentieth Day of April 1976

[SEAL]

Attest:

RUTH C. MASON
*Attesting Officer*

C. MARSHALL DANN
*Commissioner of Patents and Trademarks*